United States Patent [19]

Anzai

[11] Patent Number: 4,467,334
[45] Date of Patent: Aug. 21, 1984

[54] LASER BEAM PRINTER

[75] Inventor: Masayasu Anzai, Hitachi, Japan

[73] Assignee: Hitachi, Ltd., Tokyo, Japan

[21] Appl. No.: 310,306

[22] Filed: Oct. 9, 1981

[30] Foreign Application Priority Data

Oct. 9, 1980 [JP] Japan .................................. 55-140429

[51] Int. Cl.³ ............................................ G01D 15/14
[52] U.S. Cl. ...................................... 346/160; 346/108
[58] Field of Search .................... 346/74.7, 76 L, 154,
346/157, 160, 108, 109; 358/300–302; 354/5

[56] References Cited

U.S. PATENT DOCUMENTS

| 3,780,214 | 12/1973 | Bestenreiner et al. | 346/76 L X |
| 3,800,302 | 3/1974 | Carreira | 346/157 X |
| 4,046,471 | 9/1977 | Brauham et al. | 346/160 X |
| 4,060,323 | 11/1977 | Hirayama et al. | 346/76 L X |
| 4,189,224 | 2/1980 | Sakai | 355/4 |
| 4,205,322 | 5/1980 | Tsuzuki et al. | 346/157 X |

FOREIGN PATENT DOCUMENTS 52-28666 7/1977 Japan .

Primary Examiner—Thomas H. Tarcza
Attorney, Agent, or Firm—Antonelli, Terry & Wands

[57] ABSTRACT

A laser beam printer comprises a single scanner deflecting a plurality of laser beams for the purpose of scanning, a laser beam position detector detecting the position of one of the deflected laser beams, and a plurality of delay circuits determining the recording starting timing of the plural laser beams in response to the output signal from the laser beam position detector. The surface of a photosensitive drum is scanned with the plural laser beams to sequentially form a plurality of electrostatic latent images corresponding to a plurality of predetermined colors respectively, and the latent images are sequentially developed with a plurality of color toners during one rotation of the photosensitive drum. The color toner images are simultaneously transferred onto a recording sheet to obtain a record printed in plural colors.

8 Claims, 5 Drawing Figures

LASER BEAM PRINTER

BACKGROUND OF THE INVENTION

This invention relates to a laser beam printer adapted for performing printing by the combination of the technique of electrostatic recording such as electrophotography and the technique of scanning with a plurality of laser beams. More particularly, this invention relates to a laser beam printer suitable for printing a record in a plurality of colors.

Laser beam printers have been recently developed, in which the technique of electrostatic recording such as electrophotography is combined with the technique of scanning with a laser beam to utilize the high-speed printing capability of the electrophotography for printing a record. Such a laser beam printer is generally constructed to provide a print in a manner as described now. A photosensitive drum commonly used in electrophotography is employed, and the surface of the drum is uniformly corona-charged by a corona charger in a dark condition. The charged surface of the photosensitive drum is then exposed to a laser beam. The laser beam directed toward the photosensitive drum is subjected to brightness modulation by an electrical signal corresponding to a pattern to be printed on the surface of the photosensitive drum. The pattern is provided by an information output from an electronic computer or the like and may include ruled lines for chits, calculated values and/or data. The electrostatic latent image formed as a result of the exposure of the surface of the photosensitive drum to the laser beam is developed with a toner, and the developed image is then transferred onto a recording medium to provide a print. Thus, such a laser beam printer is widely used as an output unit of an electronic computer since it can print complex patterns including figures, characters and formats at a high speed.

It is our common experience that the contents of such a print can be readily understood when, for example, the rulings of chits, calculated values and data are printed in different colors.

SUMMARY OF THE INVENTION

There has therefore been an increasing demand for a printer capable of printing complex patterns including figures, characters and formats in respectively different colors.

With a view to satisfy such a demand, it is a primary object of the present invention to provide a laser beam printer which can perform printing in a plurality of colors in spite of a relatively simple construction.

In accordance with the present invention which attains the above object, there is provided a laser beam printer comprising a photosensitive medium in the form of a rotary drum, means for uniformly corona-charging the surface of the photosensitive medium, laser beam sources generating a plurality of laser beams respectively, a mirror scanner deflecting the plural laser beams for the purpose of scanning, a laser beam position detector generating its output signal by receiving at least one of the plural laser beams, and circuit means for determining the timing of starting modulation of each of the plural laser beams by data information applied from a data information source when it detects that a printing command signal is applied in the presence of the output signal from the laser beam position detector, the laser beam printer further comprising a plurality of exposure means for exposing a plurality of different portions of the uniformly charged surface of the photosensitive medium to the plural laser beams thereby forming electrostatic latent images on the plural different portions of the surface of the photosensitive medium, a plurality of developing means for making development of the plural latent image with a plurality of toners thereby forming a plurality of color toner images, and transfer means for simultaneously transferring the plural color toner images formed on the surface of the photosensitive medium onto a recording medium.

DETAILED DESCRIPTION OF THE PREFERRED EMBODIMENT

Figure 1:
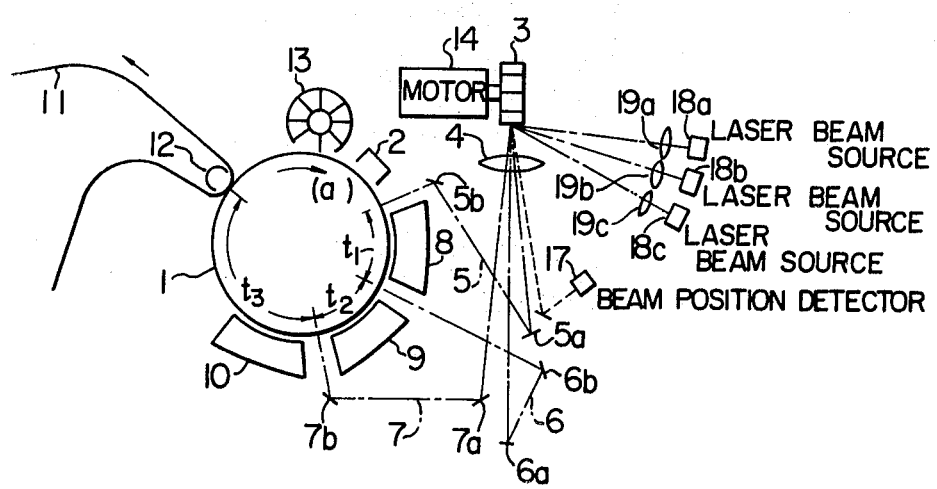
FIG. 1 is a diagrammatic view showing the structure of a preferred embodiment of the laser beam printer according to the present invention.

FIG. 1 illustrates the structure of a preferred embodiment of the laser beam printer according to the present invention. Referring to FIG. 1, a photosensitive medium 1 in the form of a drum rotates in the direction of the arrow (a), and its surface is uniformly corona-charged by a corona charger 2. The combination of a laser beam source 18a emitting a first laser beam 5, a condenser lens 19a, a mirror scanner 3 driven by a motor 14, a scanning lens 4 for focusing the laser beam and correcting a scanning beam speed, and a first group of reflecting mirrors 5a, 5b directs the first laser beam 5 toward the photosensitive medium 1. The first laser beam 5 scans the surface of the photosensitive medium 1 in the axial direction of the latter (which direction will be called the horizontal direction hereinafter) to form a first electrostatic latent image on the surface of the photosensitive medium 1. The laser beam source 18a is a diode laser of, for example, model HLD1400 or HLD1600 made by Hitachi, Ltd. in Japan and operates to directly modulate the laser beam by a data information signal to be recorded. The first electrostatic latent image is then developed by a first developing unit 8 with a toner of a first color.

Subsequently, the combination of a diode laser 18b emitting a second laser beam 6, a condenser lens 19b, the mirror scanner 3, the scanning lens 4 and a second group of reflecting mirrors 6a, 6b directs the second laser beam 6 toward the photosensitive medium 1 to similarly form a second electrostatic latent image which is developed by a second developing unit 9 with a toner of a second color. Subsequently, the combination of a diode laser 18c emitting a third laser beam 7, a condenser lens 19c, the mirror scanner 3, the scanning lens 4 and a third group of reflecting mirrors 7a, 7b directs the third laser beam 7 toward the photosensitive medium 1 to similarly form a third electrostatic latent image which is developed by a third developing unit 10 with a toner of a third color. The toner images of three colors thus formed are simultaneously transferred onto a recording medium 11 by a transfer unit 12. Thereafter, the toner particles remaining on the surface of the photosensitive medium 1 are removed by a cleaner 13, so that the photosensitive medium 1 is ready for reuse. In this manner, tricolor toner images are continuously transferred onto the recording medium 11, and the transferred toner images are finally fixed to the recording medium 11 for use.

In the laser beam printer having the structure above described, the three scanning laser beams 5, 6 and 7 emitted from the three diode lasers 18a, 18b and 18c respectively are projected on substantially the same surface portion of the rotating mirror scanner 3 at angles different from one another to be deflected for scanning at the same angular velocity. The laser beams are finally directed onto the charged surface of the photosensitive medium 1 as three discrete beams after passing through the scanning lens 4 and being reflected by the respective reflecting mirror groups 5a, 5b; 6a, 6b; and 7a, 7b. Therefore, the laser beam printer of the present invention requires only one mirror scanner 3 and only one scanning lens 4 both of which are expensive, and diode lasers which are small in size and inexpensive can be satisfactorily used as the laser beam sources. 17 denotes a laser beam position detector and its function will be described with reference to FIG. 2.

Figure 2:
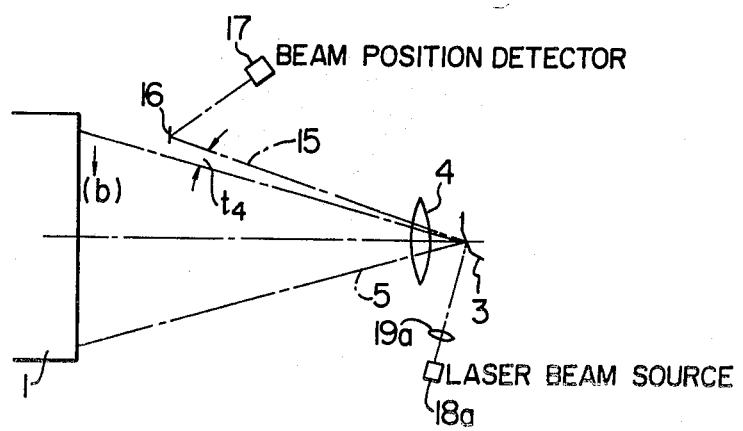
FIG. 2 is a diagrammatic view showing the mechanism of laser beam position detection by the laser beam position detector in the printer of the present invention shown in FIG. 1.

FIG. 2 illustrates the mechanism of laser beam position detection in the present invention. According to the present invention, it is merely necessary to detect the position of a selected one of the three laser beams 5, 6 and 7. For convenience of explanation, the manner of detecting the position of the first laser beam 5 will be described.

The laser beam emitted from the diode laser 18a is directed past the condenser lens 19a, the rotary mirror scanner 3, and the scanning lens 4 (which may be omitted in some cases) to scan the surface of the drum-shaped photosensitive medium 1 in the direction shown by the arrow (b). In FIG. 2, the reference numeral 5 designates the scanning laser beam used for scanning the recording region, and 15 designates the scanning laser beam used for the beam position detection. The latter scanning laser beam 15 is distinguished from the former scanning laser beam 5. The scanning laser beam 15 is reflected by a mirror 16 toward a laser beam position detector 17 which detects the laser beam position and generates its output signal indicative of the detected beam position. This detector output signal is taken as a reference, and recording takes place in $t_4$ seconds after this reference time.

In order to record images in two or three colors by the printer having the structure shown in FIG. 1, it is necessary to accurately record individual color images at desired positions. To this end, the horizontal scanning positions and vertical scanning positions of the individual laser beams must be accurately controlled. (Herein, the direction of rotation of the photosensitive medium 1 is called the vertical direction.) Thus, in regard to the horizontal direction, the time $t_4$ shown in FIG. 2 must be adjusted for each of the individual laser beams 5, 6 and 7 so that each individual laser beam can start recording at substantially the same horizontal position allotted thereto. In FIG. 1, there is shown that the first laser beam 5 makes recording on the surface of the photosensitive medium 1 for a period of time $t_1$ in the vertical direction, and, then, the second laser beam 6 makes recording for a period of time $t_2$ in the vertical direction, followed by recording by the third laser beam 7. Thus, in regard to the vertical direction, the periods of time $t_1$ and $t_2$ must be adjusted so that each individual laser beam can start scanning at substantially the same vertical position allotted thereto thereby ensuring matching of the plural images. Further, the starting timing of recording by the first laser beam 5 must be so controlled that the position on the surface of the photosensitive medium 1 at time $t (=t_1+t_2+t_3)$ after the first laser beam 5 has started scanning coincides with a predetermined position on the recording medium 11 (the position on each page of the recording media).

The above requirements apply to printing in two colors and also to printing in more colors. The beam position adjustment in the case of printing in three colors will be described, by way of example.

One form of beam position adjustment according to the present invention will be described with reference to FIG. 3.

Figure 3:
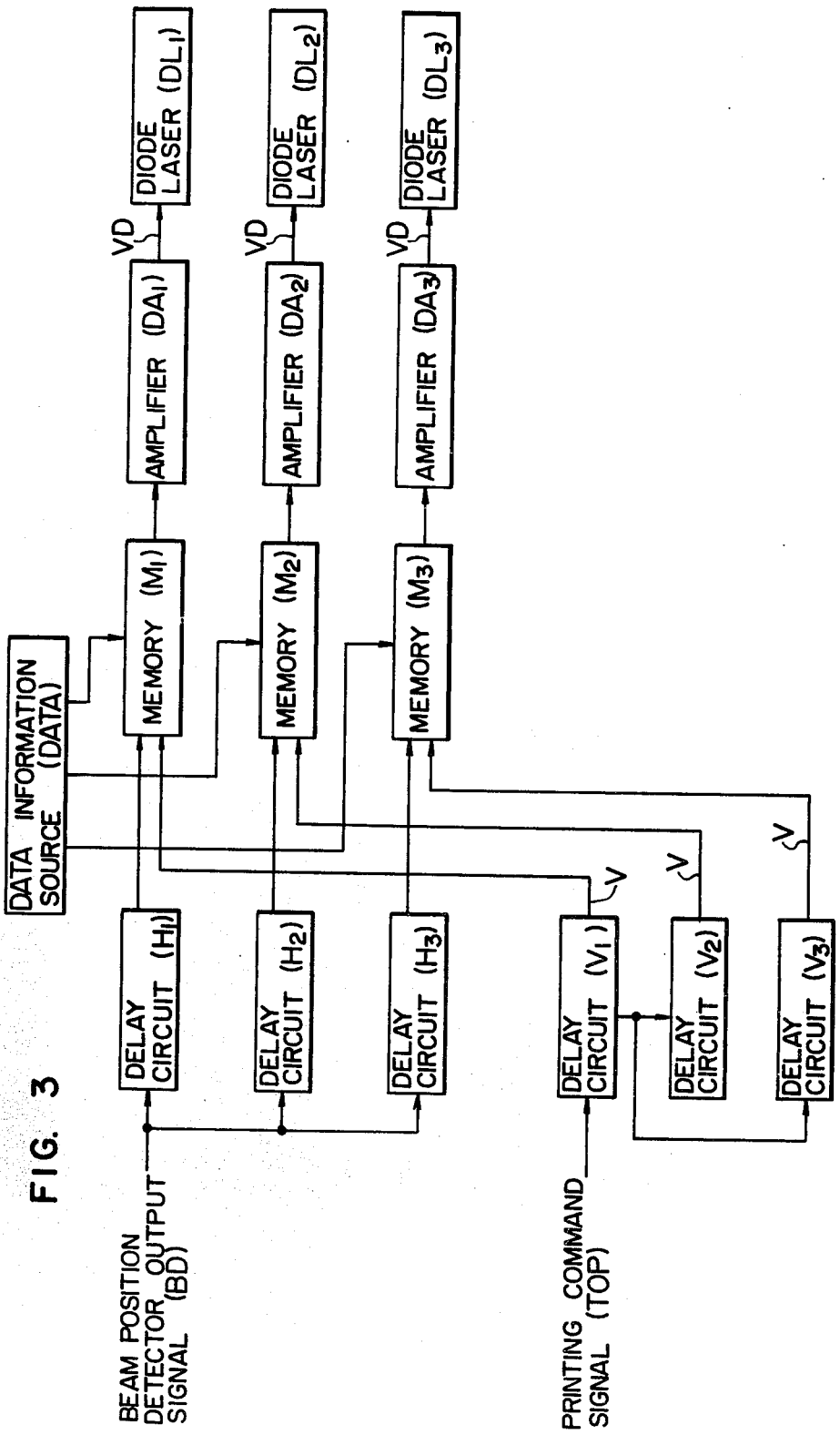
FIG. 3 is a block diagram of an electrical circuit preferably employed in the present invention for determining the timing of starting modulation of the scanning laser beams.

Referring to FIG. 3, for the purpose of controlling the starting timing of recording by horizontal scanning with the first, second and third laser beams 5, 6 and 7, the output signal BD of the laser beam position detector 17 is applied to delay circuits $H_1$, $H_2$ and $H_3$ which are, for example, shift registers or one-shot multivibrators. On the other hand, for the purpose of controlling the starting timing of recording in the vertical direction, a printing command signal TOP, which is one of signals controlling the operation of the printer and indicates the top of record on a page, is applied to one of delay circuits $V_1$, $V_2$ and $V_3$ which are, for example, shift registers or one-shot multivibrators, so as to control the position of the top of record provided by each of the first, second and third laser beams 5, 6 and 7 on a page, hence, the recording starting positions on a page. The delay circuit $V_1$, to which the printing command signal TOP is applied, controls the position of the image formed by scanning with the first laser beam 5 relative to the corresponding position on the recording medium 11. The delay circuits $V_2$ and $V_3$ control the positions of the images formed by scanning with the second and third laser beams 6 and 7 relative to the position of the image formed by scanning with the first laser beam 5. When the recording starting positions of the first, second and third laser beams 5, 6 and 7 in the vertical direction are determined in the manner above described, the signal BD indicative of the position detection of the laser beam 5 ready for horizontal scanning is extracted so as to generate a horizontal recording starting timing signal for each of the first, second and third laser beams 5, 6 and 7. The printing command signal TOP commanding the starting timing of recording by the individual laser beams determines the timing of reading out data information supplied from a data information source DATA and stored in buffer memories $M_1$, $M_2$ and $M_3$. The data information signals appearing from the buffer memories $M_1$, $M_2$ and $M_3$ are applied to amplifiers $DA_1$, $DA_2$ and $DA_3$ to be subjected to wave shaping and amplification for the purpose of diode laser modulation and are thus used to modulate diode lasers $DL_1$, $DL_2$ and $DL_3$ respectively.

It will be seen that the individual color images can be acculately recorded at the predetermined positions on the photosensitive medium 1 by controlling the timing of modulating the individual diode lasers $DL_1$, $DL_2$ and $DL_3$. Although the accuracy of control is variable depending on images to be recorded, it is about ¼ to 10 dots in terms of picture elements.

Figure 4:
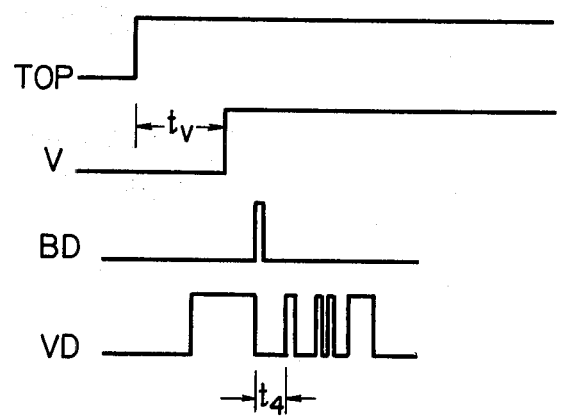
FIG. 4 is a time chart illustrating the timing of modulation of the laser beams.

FIG. 4 shows the relation among the signals used in the method of control described with reference to FIG. 3. These signals having the relation shown in FIG. 4 are controlled for each of the individual laser beams.

It will be seen in FIG. 4 that, in response to the application of the printing command signal TOP, the delay circuit $V_1$ generates its output signal V with a delay time $t_V$ for determining the vertical position of the first laser beam 5 on the photosensitive medium 1, and, after the appearance of the signal V, the horizontal recording starting timing signal is generated to start recording with a delay time $t_4$ with which the beam position detector output signal BD is delayed by the delay circuit $H_1$. The symbol VD designates the laser modulation signal.

Figure 5:
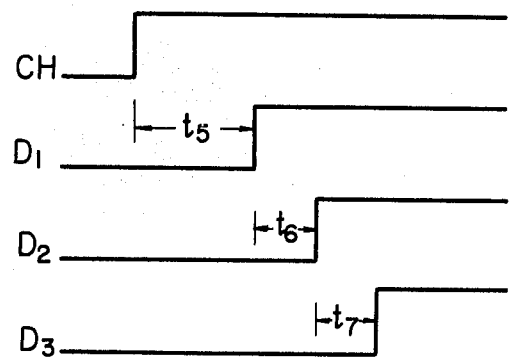
FIG. 5 is a time chart illustrating the operating timing of the developing units.

FIG. 5 is a time chart illustrating the operation timing of the developing units, by way of example, so that the toner of one color used in one of the developing units may not enter another developing unit using the toner of another color during the operation of the laser beam printer having the structure shown in FIG. 1. In FIG. 5, the symbols CH, $D_1$, $D_2$ and $D_3$ designate the charging timing of the corona charger 2 and the operation timing of the first, second and third developing units 8, 9 and 10 respectively. It will be seen in FIG. 5 that the corona charger 2 starts to corona-charge the photosensitive medium 1 with the timing CH, and, then, the first developing unit 8 starts to operate after a period of time $t_5$ required for the initially charged portion of the photosensitive medium 1 to move past at least the position of the first developing unit 8, as shown by $D_1$. Thereafter, similarly, the second developing unit 9 starts to operate after a period of time $t_6$, and the third developing unit 10 starts to operate after a period of time $t_7$. In this case, the periods of time $t_6$ and $t_7$ may be $t_6=t_7=0$ when the initially charged portion of the photosensitive medium 1 moves past the third developing unit 10 before the end of the period of time $t_5$.

The number of colors used for printing by the laser beam printer according to the present invention can be suitably selected, or the printing order of the colors can be changed as desired, as follows:

(1) When it is desired to change the corresponding relationship between three colors and data information, the data information primarily used for modulating the first, second and third laser beams 5, 6 and 7 are replaced by the corresponding data information.

(2) When it is desired to selectively use two out of the three colors, the corresponding developing units and laser beams are selected, and the data information primarily used for laser beam modulation are replaced by the corresponding data information. In this case, however, it is necessary that the diode laser emitting the laser beam to be detected by the beam position detector 17 be energized for at least the period of time required for the detecting operation of the beam position detector 17 although its laser beam may not or need not be modulated.

(3) When it is desired to selectively use only one of the three colors, the first laser beam 5 among the three laser beams is only selected to carry all the data information to be recorded, and the corresponding developing unit is selected or the corresponding laser beam is modulated by the information to be recorded. In this latter case, at least the diode laser emitting the laser beam to be detected by the beam position detector 17 is energized as in (2).

The printing order of the colors can be changed or some of the colors can be selectively used in the manner above described. If it is desired to print a record in colors other than the pre-selected colors, the developing units may be made detachable so that they can be replaced by others, or extra developing units containing toners of other colors may be automatically or manually inserted into predetermined positions in the printer so as to meet such a demand.

It will be understood from the foregoing description that the laser beam printer according to the present invention can print a record in two, three or more colors without the necessity for appreciably increasing the number of components and also without any reduction in the printing speed.

The laser beam printer of the present invention shown in FIG. 1 has been described as being of the type which effects development by the steps of corona charging→first exposure→first development→second exposure→second development . . . , by way of example. It is apparent, however, that the present invention is equally effectively applicable to a printer type in which the steps of corona charging, exposure and development are repeated or to another printer type in which a single developing unit containing a mixture of a positive toner and a negative toner is provided to effect simultaneous development in two colors. The present invention is similarly equally applicable to a printer structure in which a plurality of beam position detectors are provided for the laser beam position control but the number of them is less than that of laser beams. Further, the present invention is also equally effectively applicable to a printer type adapted for printing a record by the combination of image recording by a laser beam and image recording by an optical system. Furthermore, the present invention is also equally effectively applicable to a non-color printer in which two or more laser beams as used for printing data information read out from data information sources of two systems.

I claim:

1. A laser beam printer comprising a photosensitive medium in the form of a rotary drum, means for uniformly corona-charging the surface of said photosensitive medium, laser beam sources generating a plurality of laser beams, respectively, a mirror scanner deflecting said plural laser beams for the purpose of scanning, a laser beam position detector generating its output signal by receiving at least one of said plural laser beams, and circuit means for determining the timing of starting modulation of each of said plural laser beams by data information applied from a data information source means when it detects that a printing command signal is applied in the presence of the output signal from said laser beam position detector, said laser beam printer further comprising a plurality of exposure means for exposing a plurality of different portions of the uniformly charged surface of said photosensitive medium to said plural laser beams thereby forming electrostatic latent images on said plural different portions of the surface of said photosensitive medium, developing means for enabling development of said plural latent images with toners of a plurality of predetermined colors thereby forming a plurality of color toner images, and transfer means for simultaneously transferring said plural color toner images formed on the surface of said photosensitive medium onto a recording medium.

2. A laser beam printer as claimed in claim 1, wherein said circuit means includes a plurality of memory elements connected to said data information source means and provided for said plural laser beams respectively, a plurality of amplifiers amplifying the output signals of said plural memory elements for modulating said plural laser beams respectively, a plurality of first delay circuits delaying the output signal of said laser beam position detector for determining the timing of scanning with said plural laser beams in an axial direction of said photosensitive medium, and a plurality of second delay circuits delaying said printing command signal for determining the scanning positions of said plural laser beams in the direction of rotation of said photosensitive medium.

3. A laser beam printer as claimed in claim 1, wherein said circuit means includes means for determining the timing of scanning with said plural laser beams in an axial direction of said photosensitive medium in response to the detection of said single laser beam by said laser beam position detector.

4. A laser beam printer as claimed in claim 1, wherein, when it is desired to change the corresponding relationship between three colors and data information initially utilized, replacing means are provided for replacing the data information initially used for modulating said plural laser beams with data information corresponding to the changed relationship.

5. A laser beam printer as claimed in claim 1, wherein the predetermined colors include three colors, when it is desired to selectively use two out of the three colors and wherein said developing means comprises plural developing units, selecting means are provided for selecting predetermined ones of said plural developing units and said laser beams, and replacing means are provided for replacing the data information initially used for laser beam modulation with three colors with data information corresponding to the two colors selected, said laser beam sources emitting the laser beam to be detected by said laser beam position detector being energized by energizing means for at least the period of time required for the detecting operation of said laser beam position detector.

6. A laser beam printer as claimed in claim 1, wherein said developing means includes a plurality of detachable developing units to permit printing in colors other than the predetermined colors.

7. A laser beam printer as claimed in claim 1, wherein said data information source means includes plural data information sources.

8. A laser beam printer as claimed in claim 1, wherein said developing means includes a plurality of developing units.

* * * * *